United States Patent [19]

Teske

[11] 4,415,102
[45] Nov. 15, 1983

[54] DEVICE FOR EMPTYING A ROUND BULK-MATERIAL SILO

[76] Inventor: Lothar Teske, Hegelstr. 15, 5000 Cologne 90, Fed. Rep. of Germany

[21] Appl. No.: 278,565

[22] Filed: Jun. 29, 1981

[30] Foreign Application Priority Data

Mar. 3, 1981 [DE] Fed. Rep. of Germany ....... 3107966

[51] Int. Cl.³ .............................................. B65G 65/48
[52] U.S. Cl. .................................... 222/411; 414/304
[58] Field of Search ............... 222/411, 412, 564, 310, 222/342, 367; 414/304, 325; 198/778

[56] References Cited
U.S. PATENT DOCUMENTS
4,150,701  4/1979  Rebucci .............................. 414/304

FOREIGN PATENT DOCUMENTS
1771482  7/1958  Fed. Rep. of Germany .
1259250  1/1968  Fed. Rep. of Germany .
1275470  8/1968  Fed. Rep. of Germany .
1072847  6/1967  United Kingdom ................ 222/411

Primary Examiner—Stanley H. Tollberg
Attorney, Agent, or Firm—Jacobs & Jacobs

[57] ABSTRACT

Device for emptying a vertical, round, bulk-material silo of simplified construction and reduced maintenance and cost of manufacture, and prevention of bulk materials discharged through an annular gap being impeded in its passage through a chute. Motor drive means used for rotation of an associated bucket wheel protected against damage from bulk-material movements.

12 Claims, 4 Drawing Figures

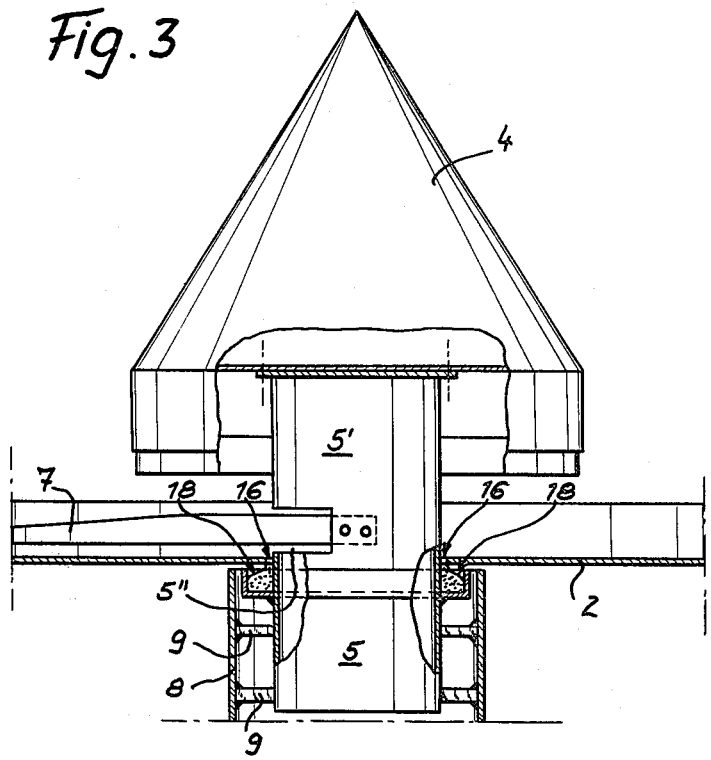
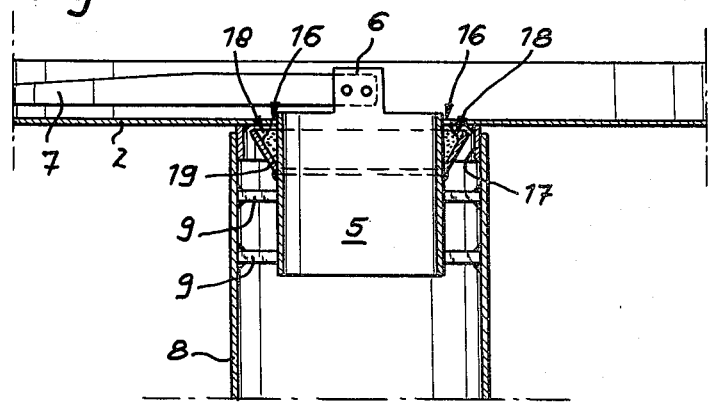

DEVICE FOR EMPTYING A ROUND BULK-MATERIAL SILO

The present invention relates to improvements in devices for emptying round, bulk-material silos which are simple in construction and operation and which simplify monitoring and maintenance as well as reducing the cost of manufacture.

It is known in devices of the present type from West Germany OS 1 940 714 to provide a conical insert to prevent conveyance exclusively by gravity of the bulk material through a frustoconical chute wherein the chute is fastened to a mounting plate arranged below the silo bottom and supported on the frame for rotation around a vertical axis, said mounting plate having a circumferential toothing into which engage pinions of two drive motors secured to the frame.

There furthermore extend from the mounting plate two paraxially directed bolts which pass through the chute and extend beyond the silo bottom, a separate double-armed bucket-wheel arm being pivoted to each of said bolts, their force arms being connected with each other by a tie-rod which is directed diametrically to the chute.

That construction is, however, relatively expensive and heavy, and the cross-section of the passageway of the chute is considerably reduced by manner of mounting the bucket-wheel arm mounts, thus resulting in interference with the conveyance of the bulk material and, furthermore, the bulk material which passes through an annular gap between the chute and the discharge opening has access to the drive elements so that their operation is then at least endangered and the wear thereof is considerably accelerated.

The present invention relates to a simplified and improved device for emptying a vertical round bulk-material silo in which the round silo has a horizontally arranged bottom fixed to the frame, with a centrally arranged bulk-material discharge opening, and above the bottom there is arranged a bucket wheel which is rotatable around a vertical axis, sweeps over the bottom and efficiently conveys the bulk material to the central discharge opening. Above the bucket wheel there is arranged a conical insert which is coaxial to the bucket wheel, is larger in diameter than the discharge opening and has its tip pointing upward. The bucket wheel is fastened to a tubular chute which is arranged coaxially to the discharge opening and rotatably supported below the bottom of the silo. It can be placed in rotation by a motor drive mounted on the frame below the bottom of the silo, the upper opening of the chute being arranged so as to terminate approximately flush with the top side of the bottom of the silo and with clearance from the soffit of the discharge opening. Bucket-wheel mountings are provided on the chute and extend to above the bottom of the silo.

The attainment of the objects of the invention results from a combination of the features disclosed more particularly hereinbelow, and the frame-fixed mounts for the rotary connection previously required are eliminated.

Furthermore, assurance is now provided that the bulk material passing through the annular gap will pass into the second chute without being impeded in this respect by the stream of bulk material passing through the first chute and without endangering the operation of the drive elements, the drive elements being arranged in such manner that they are freely accessible.

A preferred embodiment of the chutes which both simplifies manufacture and favors the required passage of the bulk material will be understood from the fact that both chutes are cylindrical, the second chute extending down below the first chute and the arrangement of the chutes with respect to the associated parts of the device.

In order to favor, inter alia, any possible required replacement of the bucket-wheel arms it is advantageous to construct the second chute in two parts having a plane of separation at right angles to the longitudinal axis and arranged approximately in the plane of the lower opening of the first chute.

Other advantages will be appreciated from the structure and relationships of the various component parts as herein described.

A particular embodiment of the present invention and modified forms thereof are shown in the accompanying drawings wherein:

FIGS. 3 and 4 are partly sectional and partly elevational views of modified forms of certain parts of the invention.

Figure 1:
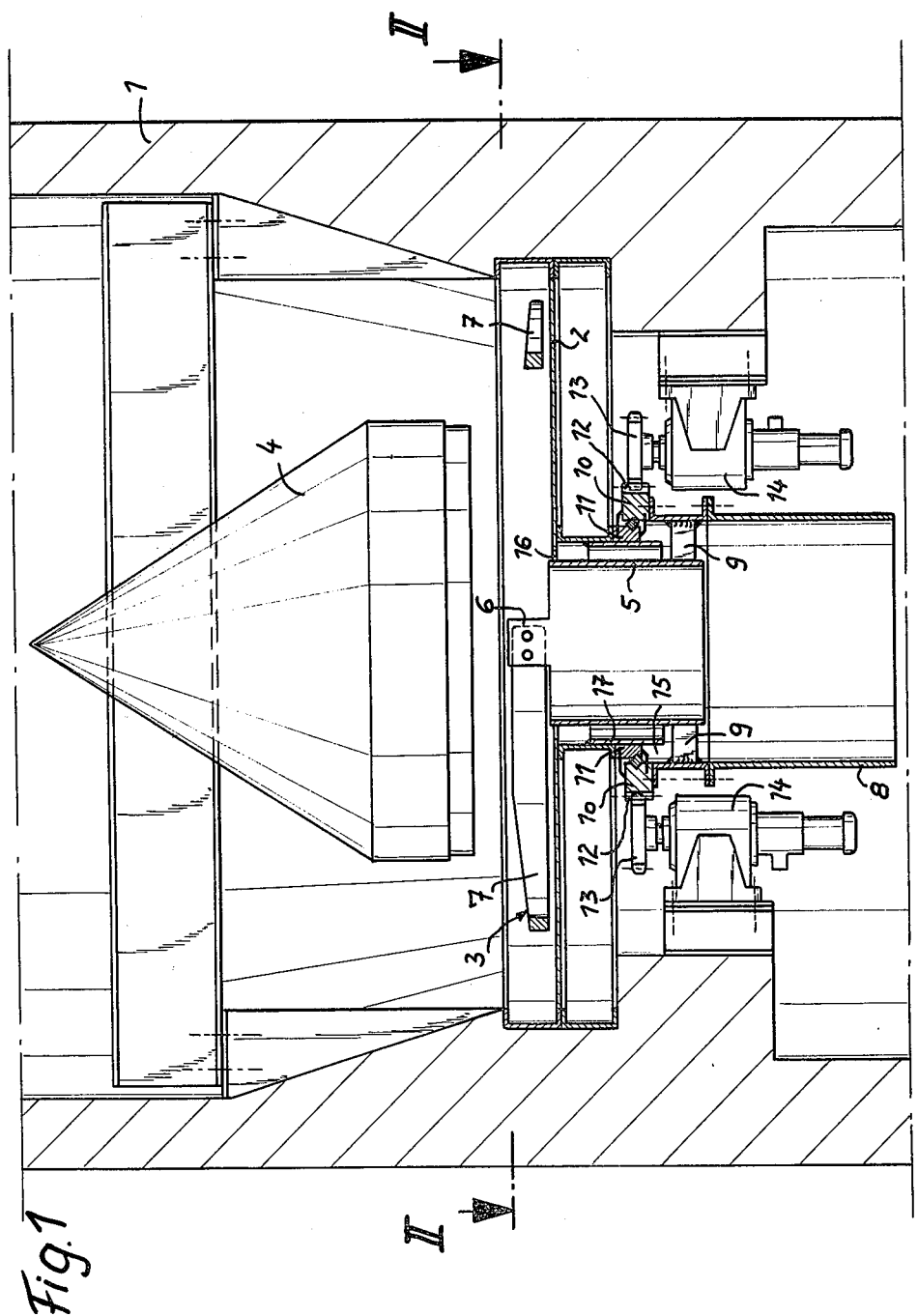
FIG. 1 is a longitudinal sectional view through a silo equipped with a discharge device according to the invention.

The concrete silo 1 for bulk material is of annular cross section and has a steel bottom 2 firmly installed therein and a centrally disposed bulk-material discharge opening.

Above the steel bottom 2 there is a rotatable bucket wheel 3 and spaced from the latter and above it there is a substantially conical insert 4, the tip of which points upwardly and the largest diameter of which is greater than that of the circular discharge opening. The bucket wheel 3 is secured to a depending cylindrical chute 5 which is arranged coaxially to the discharge opening and the upper opening of which is arranged with clearance from the hole edge parts of the discharge opening and terminates approximately flush with the upper side of the steel bottom 2.

From the chute 5 there are cut two diametrically arranged relatively narrow wall parts 6 which extend above the bottom 2 and to the outer sides of which the respective bucket-wheel arms 7 are detachably bolted. Coaxially to the chute 5 there is a second chute 8 which has a diameter larger than the discharge opening and is firmly connected to the chute 5 by means of a plurality of struts 9 distributed around the circumference of the chute 5.

Figure 2:
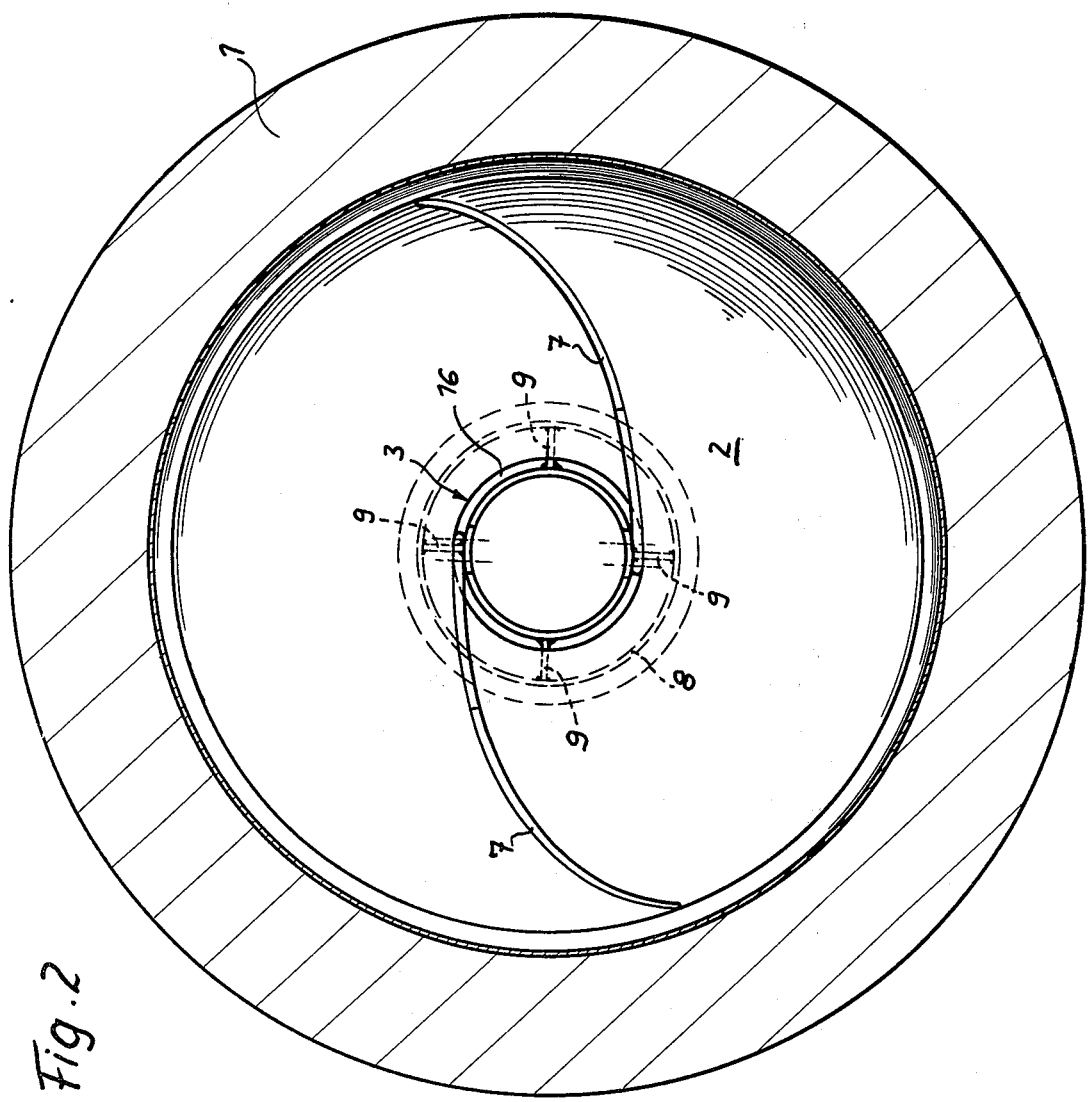
FIG. 2 is a sectional view taken on the line II—II of FIG. 1 looking in the direction of the arrows.

The chute 8 is composed of two separate parts which are detachably connected by means of radial flanges, as shown in FIGS. 1 and 2.

The upper part of the chute 8 is connected to the outer race 10 of a rotary connection with anti-friction bearings and the inner race 11 is secured to the lower side of the steel bottom 2.

Seals are provided on the rotary connection to protect the anti-friction bearings and their races from dirt.

On the periphery of the outer race 10 there is provided a toothing 12 with which engages the pinions 13 of two diametrically oppositely arranged drive motors 14 which are secured to the silo frame.

Furthermore, within the annular space 15, formed between the chutes 5 and 8 and the cross-section of passage of which is greater than that of the annular gap 16, there is provided a ring-shaped bulk-material guide plate 17 which is larger in diameter than the discharge opening and arranged coaxially to the latter, the upper end part of the plate being fastened to the wall at a widening of the discharge opening, and its lower end part extends through the inner race 11 down into the chute 8, the plate being out of contact with the two chutes 5 and 8. The chute 8 extends downwardly below the two motors 14.

In FIG. 3 the chute 5 has an individual part 5' thereon of the same profile and part 5' extends above the silo bottom 2, the insert 4 being fastened in coaxial alignment to said part so that upon the rotation of the chute 5 and of the bucket wheel 3 the insert rotates synchronously with them, thereby effecting a loosing of any bulk material present in the silo.

Within the chute, to which in this case only one bucket-wheel arm 7 is fastened, there is provided, at the same level of the latter, in front of the point of connection of the bucket-wheel arm 7, a cut-out or window 5" through which the bulk material conveyed by the bucket wheel 7 can discharge into the chute 5.

The window 5" is sufficiently large that the discharge of the bulk material is not impeded but is also kept as small as possible in order to assure the greatest possible non-deformability of the chute 5 in the region of the window.

Furthermore, an annular trough 18 is fastened to the chute 5 below the annular gap 16 with slight clearance from the silo bottom 2, the trough 18 being so shaped that bulk material passing through the annular gap 16 can pass solely into the trough 18, building up there until it rests against the lower side of the silo bottom 2, and then itself acts as a maintenance-free seal for the annular gap 16.

As can be noted from FIG. 4, the trough 18 can be formed of a frustoconical, downward-tapered collar 19, the small mouth of which is fastened in tightly sealing manner to the chute 5.

In order further to increase the assurance against dirt entering the rotary bearing and the drive, an annular guide plate 17 is provided similarly to FIG. 2.

The invention comprises the novel, individual features and combinations and sub-combinations thereof, and may be further modified within the terms of the approved claims without departing from the invention.

What is claimed is:

1. A device for emptying a vertical, round, bulk-material silo comprising an annular silo having a horizontal box-like enclosed bottom secured to a frame of the side and a centrally disposed bulk-material discharge opening in said bottom, a series of bucket wheel arms secured at one end above said bottom rotatable around a vertical axis and sweeping synchronously over said bottom to convey bulk material in the silo to the central discharge opening, a conical insert in the silo above the bucket wheel arms and disposed coaxially thereof, being larger in diameter at its base than the discharge opening and having its tip pointing upward, the bucket wheel arms being fastened to a first tubular chute arranged coaxially with respect to the discharge opening and rotatably supported below the bottom of the silo, motor drives fixed to opposite sides of the frame below the bottom of the silo for rotating the bucket wheel arms, the first chute having an upper opening terminating approximately flush with the upper side of the silo bottom with clearance from the soffit of the discharge opening, and the first chute being provided with bucket-wheel arm mounts extending above the bottom of the silo and a second tubular chute of larger inside diameter than the discharge opening and arranged coaxially of the first chute which supports the bucket wheel and into which second chute the first chute extends into the upper part of the second chute terminating just above a flanged connection to the lower part of the second chute, the second chute being firmly connected to the first chute by a plurality of struts distributed around the circumference of the first chute dimensioned and arranged to form an annular passage larger than the cross-section of the annular passage between the first chute and the edge portions of the discharge opening, the second chute being rotatably mounted on the silo bottom and the motor drives being arranged exteriorly of the second chute to rotate the same.

2. A device according to claim 1, wherein both chutes are cylindrical.

3. A device according to claim 1, wherein the second chute extends downwardly below the first chute.

4. A device according to claim 1, wherein all parts extend above the silo bottom and are formed on the first chute, the outside of said wall parts and the bucket-wheel arms being detachably fastened together.

5. A device according to claim 1, wherein the second chute is assembled from two separate pieces, the plane of parting extending at right angles to the longitudinal axis and being arranged approximately in the plane of the lower opening of the first chute.

6. A device according to claim 1, wherein the second chute is connected to the silo bottom by means of a rotary connection with anti-friction bearings, in such manner that the inner bearing race is fastened to the silo bottom and the second chute is connected to the outer bearing race, the bearing outer race having a circumferential toothing which cooperates with a pinion of a drive motor.

7. A device according to claim 1, wherein an annular guide plate is disposed in the annular space between the chutes and is larger in diameter than the discharge opening and screens the rotary connection off from bulk material falling through the annular gap between the first chute and the edge portions of the discharge opening.

8. A device according to claim 1, wherein the first chute is connected to the conical insert in order to carry the latter along in rotation.

9. A device according to claim 8, wherein the first chute supports the conical insert.

10. A device according to claim 8, wherein the first chute has an individual tubular part extending above the silo bottom and to which the insert is directly attached, and bulk-material passage windows provided at the level of the bucket-wheel arms which are secured to the first chute in front of the bucket-wheel connection points in the direction of rotation.

11. A device according to claim 1, wherein a circumferential trough open towards the annular passage is adapted to be filled with bulk material, extends in a radial direction beyond the annular passage and is disposed on the first chute below the silo bottom, the outer flank of said trough extending approximately to the lower side of the silo bottom.

12. A device according to claim 11, wherein a frustoconical collar which forms a trough with the first chute is arranged on the outer side of the cylindrical wall of the first chute.

* * * * *